United States Patent [19]

Houlon

[11] Patent Number: 4,957,142
[45] Date of Patent: Sep. 18, 1990

[54] TENSION LEVER FOR NEGATIVE DOBBY

[75] Inventor: Louis Houlon, Duingt, France

[73] Assignee: S.A. des Etablissements Staubli (France), Faverges, France

[21] Appl. No.: 326,562

[22] Filed: Mar. 21, 1989

[30] Foreign Application Priority Data

Mar. 31, 1988 [FR] France .................. 88 04569

[51] Int. Cl.[5] .................................. D03C 13/00
[52] U.S. Cl. .................................. 139/88; 138/82
[58] Field of Search .................. 139/57, 58, 82, 83, 139/84, 87, 88, 89

[56] References Cited

U.S. PATENT DOCUMENTS

| 3,410,314 | 11/1968 | Hopf | 139/57 |
| 4,771,812 | 9/1988 | Yokoi | 139/88 |

FOREIGN PATENT DOCUMENTS

| 0136638 | 9/1984 | European Pat. Off. | |
| 702859 | 2/1941 | Fed. Rep. of Germany | |
| 2477186 | 4/1981 | France | |
| 451253 | 9/1949 | Italy | 139/82 |

Primary Examiner—Andrew M. Falik
Attorney, Agent, or Firm—Dowell & Dowell

[57] ABSTRACT

A drawing system for controlling the heddle frames of weaving machines of the negative type wherein a cable associated with a clip element of a spring register is connected to a cable which moves the heddle frame by a tension lever mechanism carried by an oscillating lever whereby the springs of the register may be released from tension in order to facilitate the withdrawal and repositioning thereof.

8 Claims, 5 Drawing Sheets

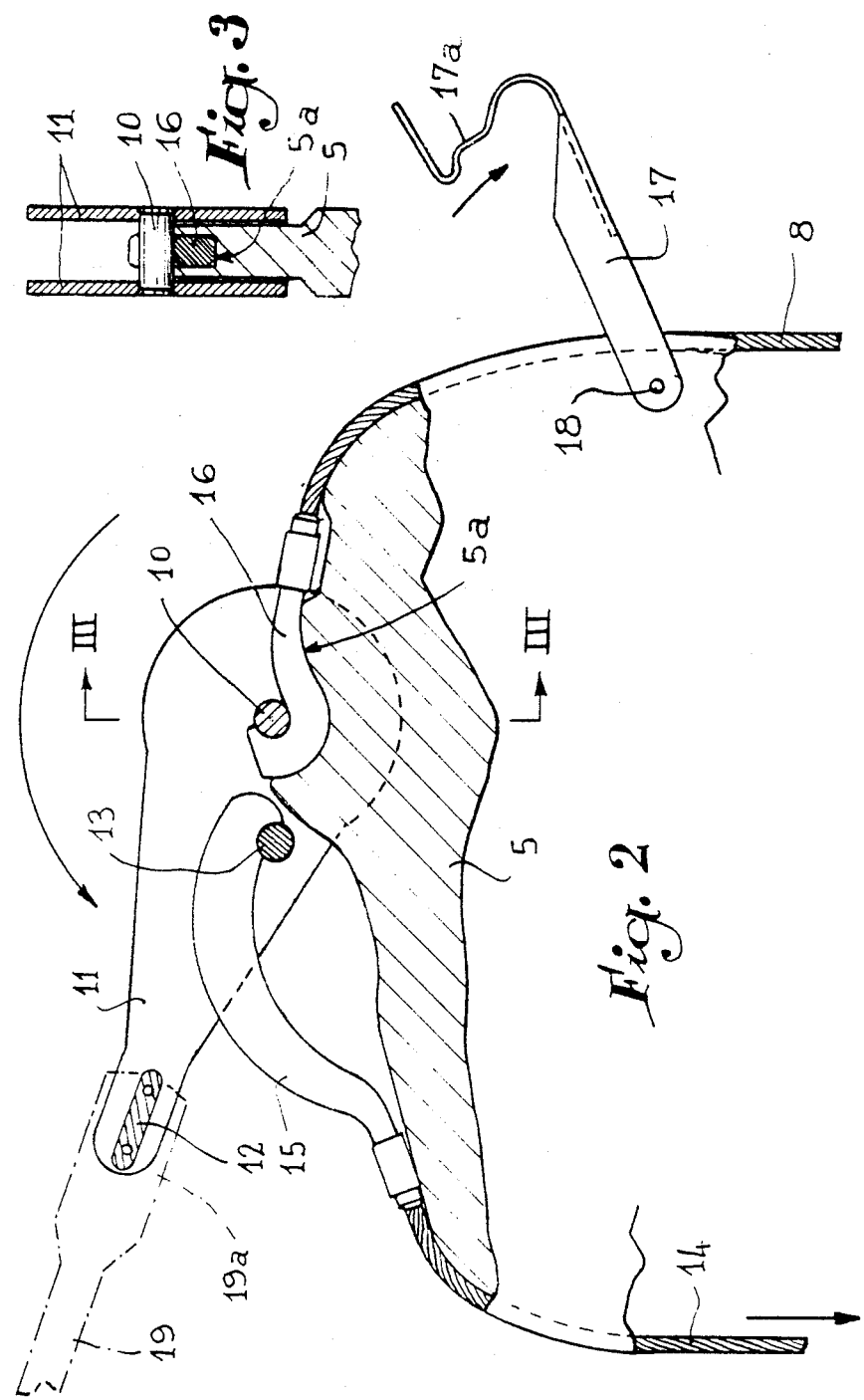

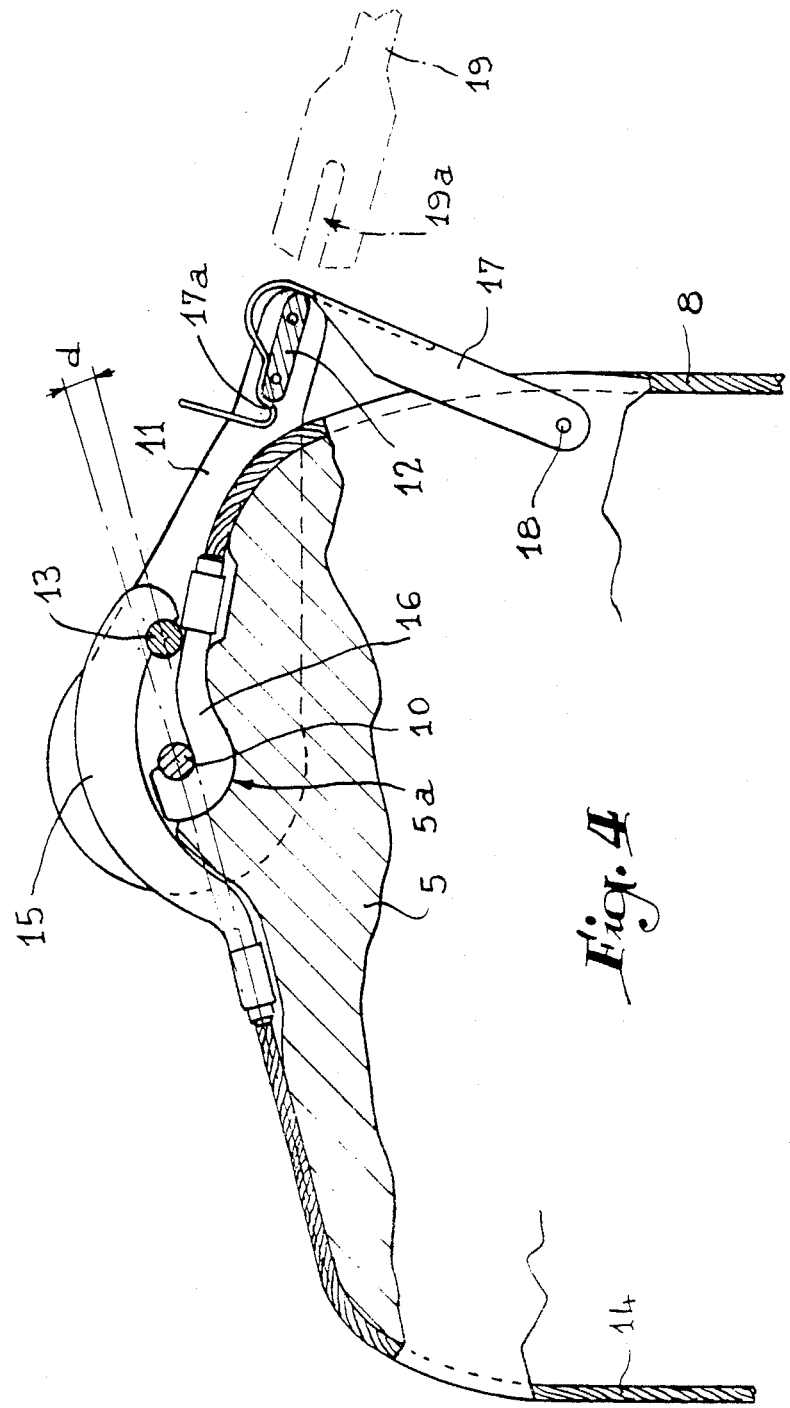

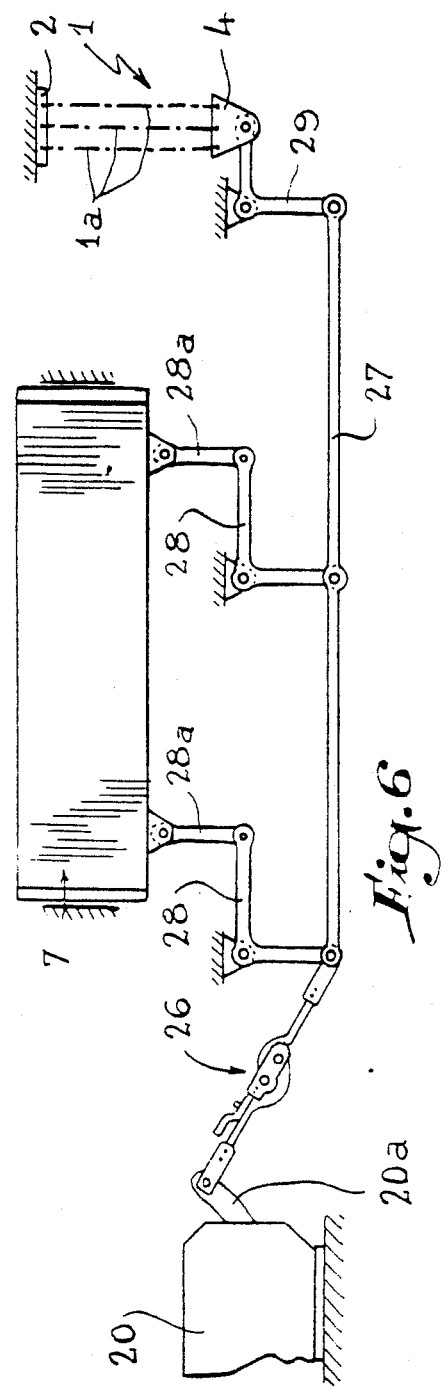
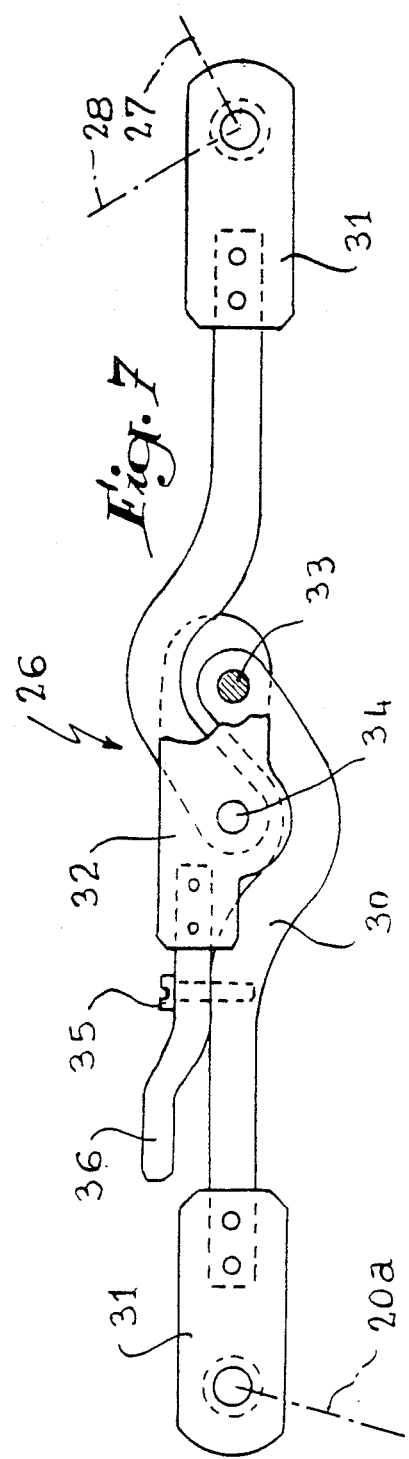

TENSION LEVER FOR NEGATIVE DOBBY

FIELD OF THE INVENTION

The present invention relates to dobbies and other weaving mechanisms of the negative type for forming the shed in weaving machines, and more particularly to the drawing systems for controlling the heddle frames associated with such mechanisms.

BACKGROUND OF THE INVENTION

The mechanisms of negative type are known to ensure positive control of the heddle frames only in one direction of displacement, with the result that elastic elements must be provided to return the frames in the other direction of a stroke.

In fact, and as has been schematically shown in FIG. 1 of the accompanying drawings, the elastic elements associated with each heddle frame are most often constituted by two series or "registers" 1 of parallel springs 1a. In each register 1, the springs 1a are retained between a rack 2 fixed to the vertical structure 3 of the weaving machine and a clip element 4 which is suspended from an oscillating lever 5. The lever 5 is mounted to a horizontal shaft or pivot 6 carried by the structure 3. On each of the two oscillating levers 5 associated with each heddle frame 7 there is connected one end of a transmission element, most often formed by a cable 8 which is secured to the frame 7 to be controlled and of which the free end, suitably guided, is hooked to the moveable member for actuating the weaving mechanism.

It will be understood that such a drawing system ensures control of the heddle frame 7 since the displacement of the moveable member provokes lowering of the frame to its lowest position against the registers 1 which are adapted to return the assembly to the upper position by action on each lever 5 as soon as the moveable member of the mechanism returns to its initial position.

The increase in the operational speeds now required of weaving machines requires an increased number of springs 1a in each register 1. To limit the efforts to be furnished by the weaving mechanism, the number and type of springs should be modified as a function of the speed of weaving and the nature of the article to be woven. Furthermore, it is not rare for a spring to break in one of the registers, so that interventions are relatively frequent.

Now, it has been shown in practice that replacement of springs is difficult due to the large number of springs in each register, the high force of these springs and the very location of the registers in the weaving machine.

SUMMARY OF THE INVENTION

It is an object of the present invention to overcome the aforementioned drawbacks, essentially by interposing on the transmission element which connects the clip element of each register to the corresponding moveable member for actuating the weaving mechanism, a tension lever mechanism adapted momentarily to relax the tension of the springs of the register by allowing an intervention, by an elongation of the transmission element consecutive to a pivoting along an axis oriented transversely to the transmission element.

BRIEF DESCRIPTION OF THE DRAWINGS

The invention will be more readily understood on reading the following description with reference to the accompanying drawings, in which:

FIG. 2 is a vertical section in detail showing the tension lever mechanism, assumed to be brought to the relaxed position of the corresponding spring register.

FIG. 3 is a transverse section along the plane indicated at III—III in FIG. 2.

FIG. 4 reproduces FIG. 2 in the tensioned position of the register.

FIGS. 6 and 7 illustrate another embodiment.

DETAILED DESCRIPTION OF THE DRAWINGS

Figure 1:
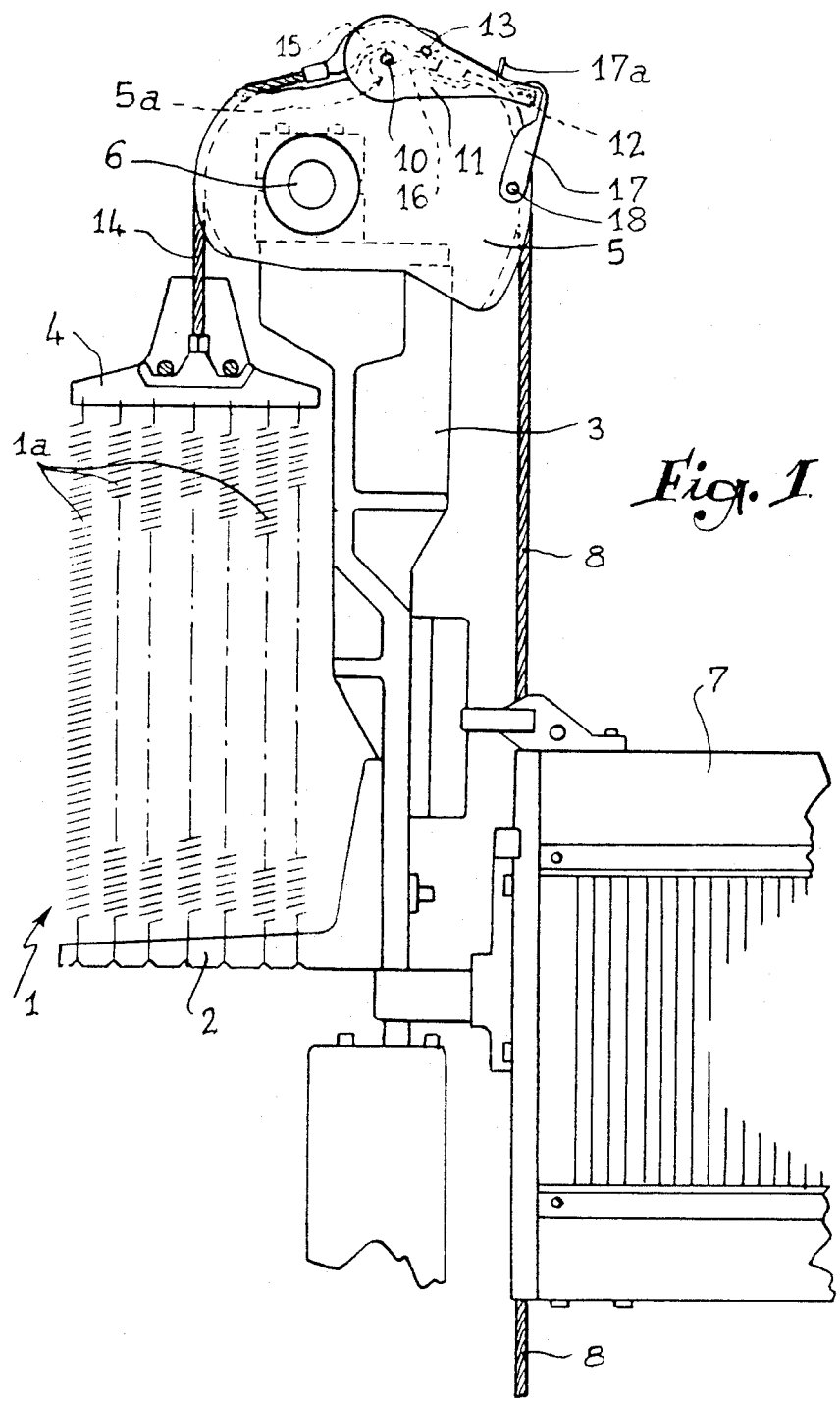
FIG. 1 schematically illustrates the arrangement of a drawing system according to the present invention

Referring now to the drawings, FIGS. 2 to 4 show that the upper part of the lever referenced 5 in FIG. 1 is shaped so as to present a cradle 5a inside which is engaged a transverse spindle 10. The ends of this spindle 10 are supported by two side elements which constitute an arm 11 and which are joined to each other by an end piece 12. Between the piece 12 and the spindle or pivot 10, the two side elements 11 carry a transverse pin 13.

Referring again to FIG. 1, it is noted that the clip element 4 of the register 1 is secured to one end of a secondary cable or transmission element 14 of which the opposite end is secured to an endpiece 15 engaged between the side element of the arm 11 and sectioned so as to hook on the pin 13, as illustrated in FIG. 2. In the same way, the upper end of the principal cable 8 attached to the heddle frame 7 is equipped with a similar endpiece 16 which fits in the cradle 5a so as to receive the spindle or pivot 10 of the arm 11, thus forming support therefor.

Under these conditions, the principal cable 8 associated with the frame 7 and the weaving mechanism (not shown), and the secondary cable 14 associated with the clip element 4 and the register 1, are connected to each other through the tension lever mechanism formed by the arm 11 which is connected to the oscillating lever 5 through the spindle or pivot 10. Further, due to the longitudinal distance existing between the spindle 10 and the pin 13, it will be understood that the total length included between the end of the cable 8 and the clip element 4 varies as a function of the orientation of the arm 11 with respect to the spindle or pivot 10.

In FIG. 2, the arm 11 is oriented towards the left, its end piece 12 thus facing the clip element 4, with the result that the springs 1a of the register 1 are not under tension and may easily be positioned in or withdrawn from the register.

On the other hand, in FIG. 4, the arm 11 has been assumed to be oriented in the opposite direction, i.e. towards the right, with the distance piece 12 facing the frame 7, in the same manner as in FIG. 1, so that the springs 1a are under tension and the register 1 is in operating mode.

The tensioned position of FIGS. 1 and 4 is perfectly stable due to the dead center being exceeded, illustrated in FIG. 4; in fact, it may be seen that, in the position shown, the straight line which passes through the axis of the cable 14 and the spindle or pivot 11 lies above the straight line which connects the axis of the cable to the pin 13 (distance d).

Although no untimely rotational displacement of the arm 11 is likely, the tension lever mechanism may nonetheless be provided with a pivoting lock 17 which is articulated at 18 on the oscillating lever 5 and of which the free end 17a is sectioned to cooperate with the end piece 12, which is thus positively retained with the arm 11 in the tensioned position of FIG. 4.

It should be observed that the end piece 12 is itself advantageously sectioned to cooperate with the forked end 19a of a removable tool 19 adapted to faciliatate the pivoting of the arm 11 having regard to the resistance exerted by the springs of the register 1.

Figure 5:
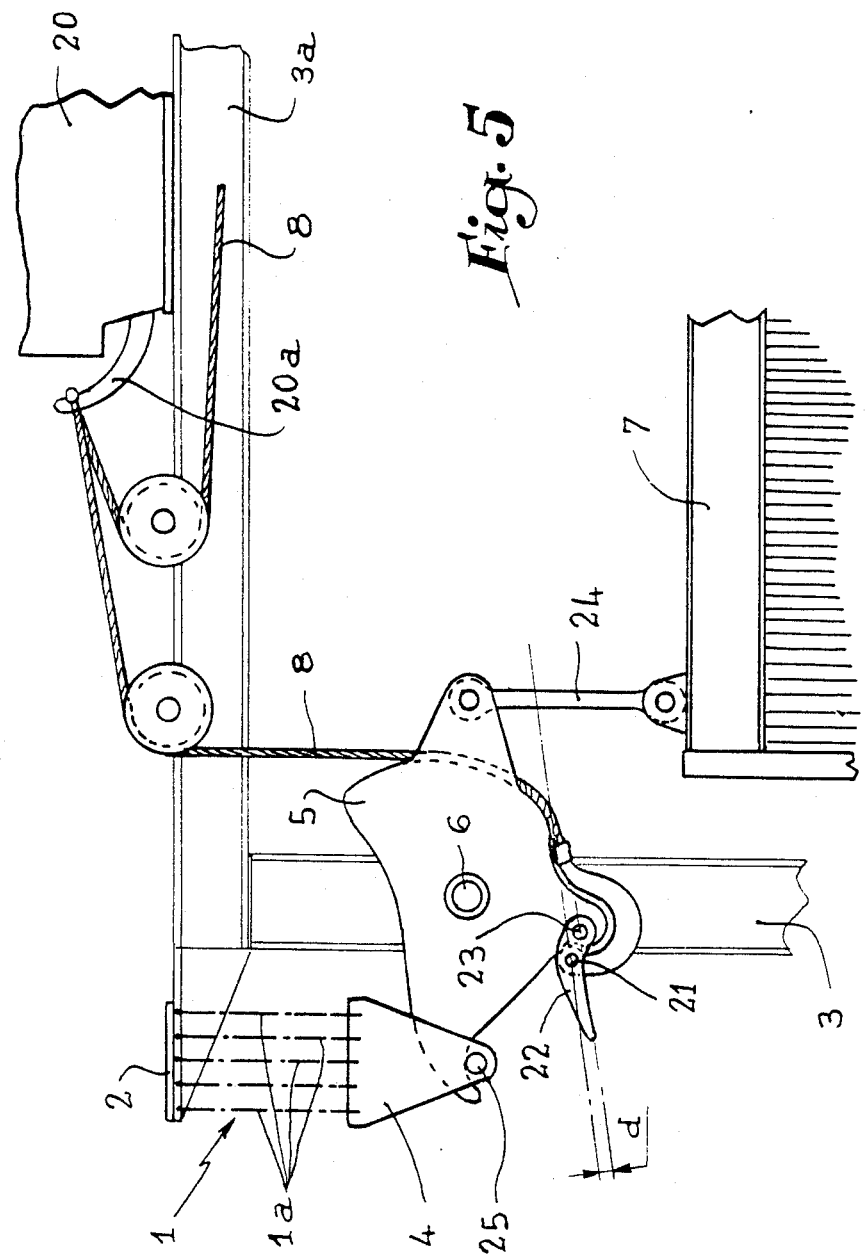
FIG. 5 shows a variant embodiment of the invention.

FIG. 5 illustrates another embodiment of the invention, in which each of the two principal cables 8 associated with the same moveable member 20a for actuating the mechanism 20 is directly secured to the corresponding oscillating lever 5 by an endpiece 16 which is sectioned to be hooked at 21 between the side elements of a tension lever mechanism formed by a pivoting arm 22, articulated at 23 on the oscillating lever 5. The lever 5 is connected on the one hand to the heddle frame 7 by a suspension rod 24 and on the other hand to the clip element 4 of the register 1 by a pin 25 cooperating with a lateral projection 5' of the lever.

With the exception of the foregoing, operation is identical to that set forth hereinabove. Pivoting of the arm 22, retained in tensioned position by the effect of the dead centre being exceeded (distance d) and/or by a lock similar to that referenced 17 in the embodiment of FIGS. 2 to 4, makes it possible to relax and retension the register 1 of which the fixed rack 2 is attached to the horizontal beam 3a of the structure 3 which supports the mechanism 20.

It will be understood that the tension lever mechanism may be placed at any point of each of the transmission elements which connect the members 20a for actuating the mechanism 20 to the corresponding spring registers. In certain cases, these transmission elements may be formed, not by cables 8 as assumed hereinabove, but by rigid lever/rod assemblies.

FIG. 6 illustrates such an embodiment of the invention. Each of the moveable members 20a for actuating the mechanism 20 is joined, via a tension lever mechanism 26, to a longitudinal rod 27 which is coupled on the one hand by levers 28 and small rods 28a to the heddle frame 7 which is suitably guided vertically, and on the other hand by a pivoting lever 29 to a single spring register 1.

The tension lever mechanism 26 presents an arrangement similar to that described hereinabove. As shown in FIG. 7, the lever mechanism comprises two sectioned rods 30 provided at one of their ends with a fixation plate 31. The opposite end of the rods cooperate with a pivoting arm 32 shaped to overlap the two concurrent ends of the rods 30 on which it is articulated about axes 33 and 34 offset with respect to each other along the axis common to the rods. It will be appreciated that the angular displacement of this arm 32 makes it possible to modify the total length between the two plates 31, the mechanism being retained in the "short" position in any appropriate manner, such as by exceeding the dead centre position or with the aid of a screw 35 which passes through the handle 36 of the arm 32 to screw in one of the rods 30.

What is claimed is:

1. In a drawing system for controlling the heddle frames of weaving mechanisms of the negative type and which includes for each heddle frame at least one elongated transmission element having a length dimension, said transmission element having one of the end portions thereof attached to a mobile member for actuating the mechanism and an opposite end portion which is assoicated with a register of springs which act to return the heddle frame after it has been moved, the improvement comprising, a tension lever member, first pin means for connecting said tension lever member to and along the length of the transmission element, second pin means for pivotally mounting said tension lever member about an axis oriented transversely to the length of the transmission element, said first pin means spaced from said second pin means and being relative movable with respect to said second pin means as said tension lever member is pivoted about said second pin means between a first and second position, said tension lever member being moveable to selectively tension and relax the springs of the register.

2. The system of claim 1, in which the transmission element is constituted by a first cable having a free end which is joined to an oscillating lever connected to a heddle frame and a second cable connected to the register, wherein the tension lever member comprises an arm which is pivotally retained on said oscillating lever by said second pin means thereby forming a stop for said free end of said first cable, said arm further carrying said first pin means which forms a stop for an end of said second cable which is connected to the register.

3. The system of claim 1, wherein said transmission element includes a first cable having a free end which is joined to an oscillating lever connected to a heddle frame, said oscillating lever including a projection for engaging the register, and said tension lever member including a pivoting arm articulated on said oscillating lever by said second pin means.

4. The system of any of claims 1 to 3, wherein said first pin means is offset relative to said second pin means by a distance such that when said tension lever member in said second position, the tension from the register of springs will act to retain said tension lever means in said second position.

5. The system of claim 4, wherein the tension lever member is retained in said second position to tension the register by a lock carried by said oscillating lever.

6. The system of claim 2 wherein said pivoting arm is formed by two parallel side elements and an end piece, and a pivotable lock having a free end which cooperates with said distance piece.

7. The system of claim 4, wherein there is associated with the tension lever member a removable manoeuvring tool whose end is shaped to cooperate with an end piece mounted to said oscillating lever thereby rendering actuation of said tension lever member easier.

8. The system of claim 1, in which the transmission element includes an assembly of rods and levers, wherein the tension lever member is formed by two sectioned rods of which the concurrent ends are joined by a pivoting arm which is coupled to said sectioned rods by said first and second pin means which are offset with respect ot each other along an axis common to said sectioned rods.

* * * * *